(No Model.) 5 Sheets—Sheet 1.
J. C. BARLOW.
CHECK ROWER ATTACHMENT FOR CORN PLANTERS.
No. 312,695. Patented Feb. 24, 1885.
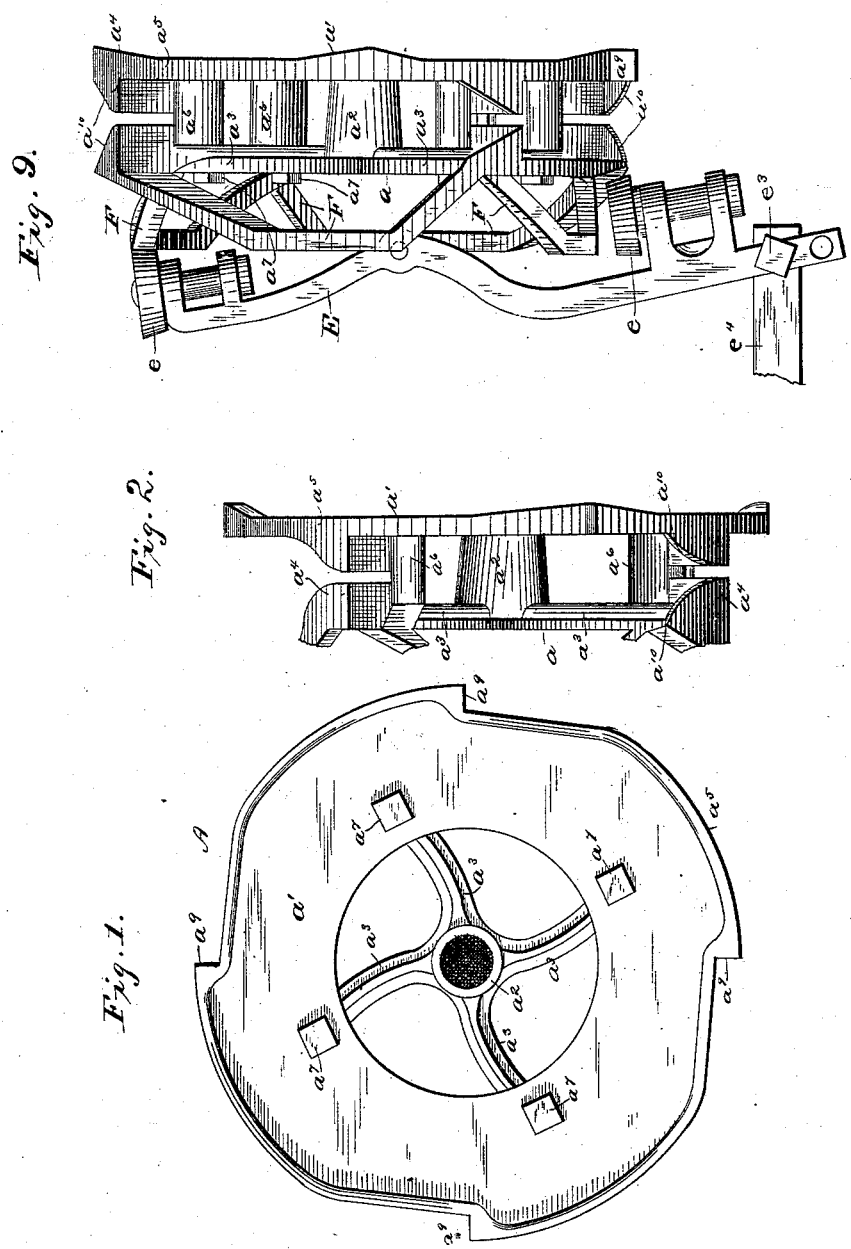
Witnesses
Chas. R. Burr
A. J. Stewart
Inventor.
Joseph C. Barlow
by Church & Church
His Attys.

(No Model.) 5 Sheets—Sheet 2.
J. C. BARLOW.
CHECK ROWER ATTACHMENT FOR CORN PLANTERS.
No. 312,695. Patented Feb. 24, 1885.
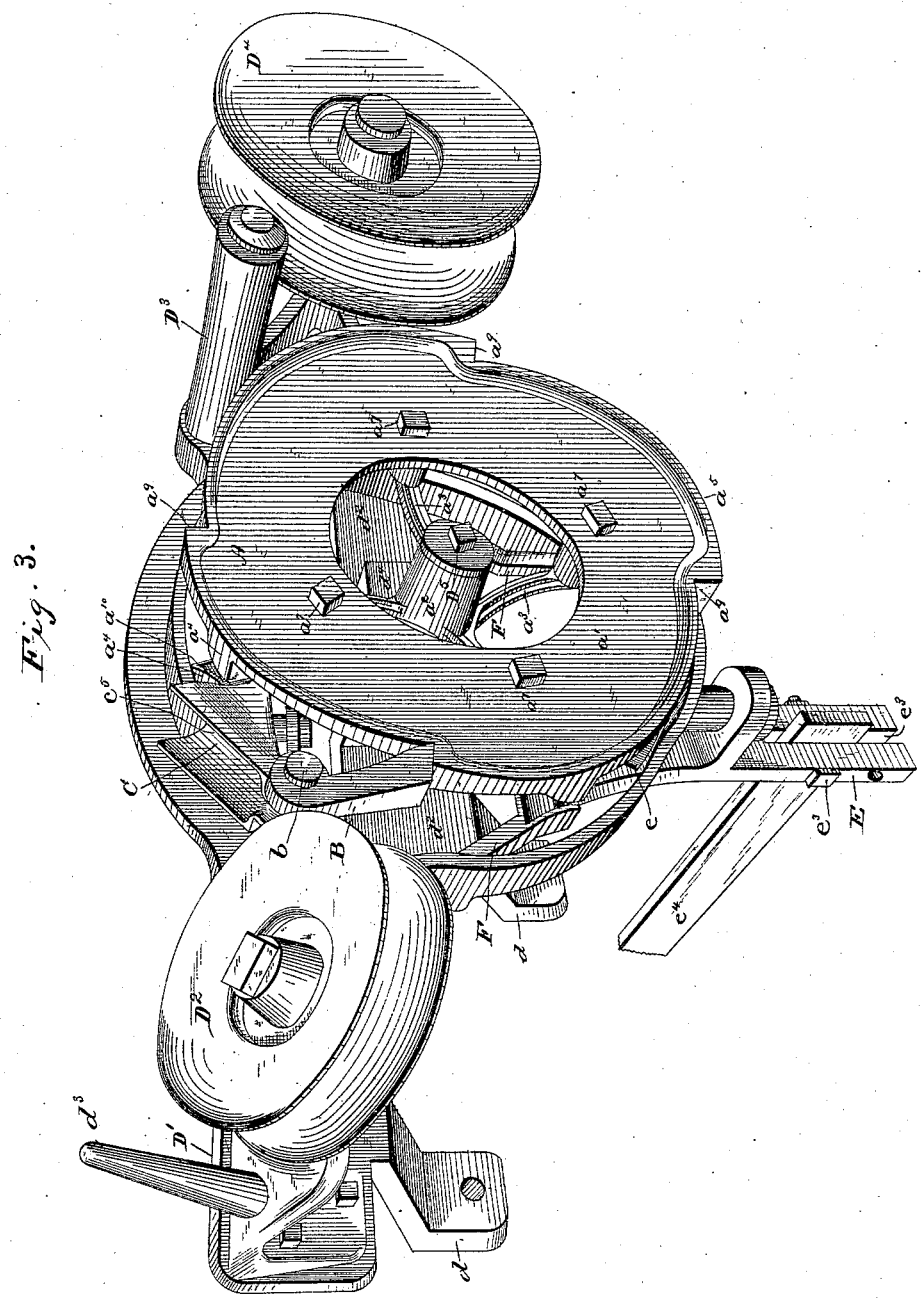
WITNESSES
Chas. R. Burr
A. J. Stuart
INVENTOR
Joseph C. Barlow,
by Church & Church
His Attorneys

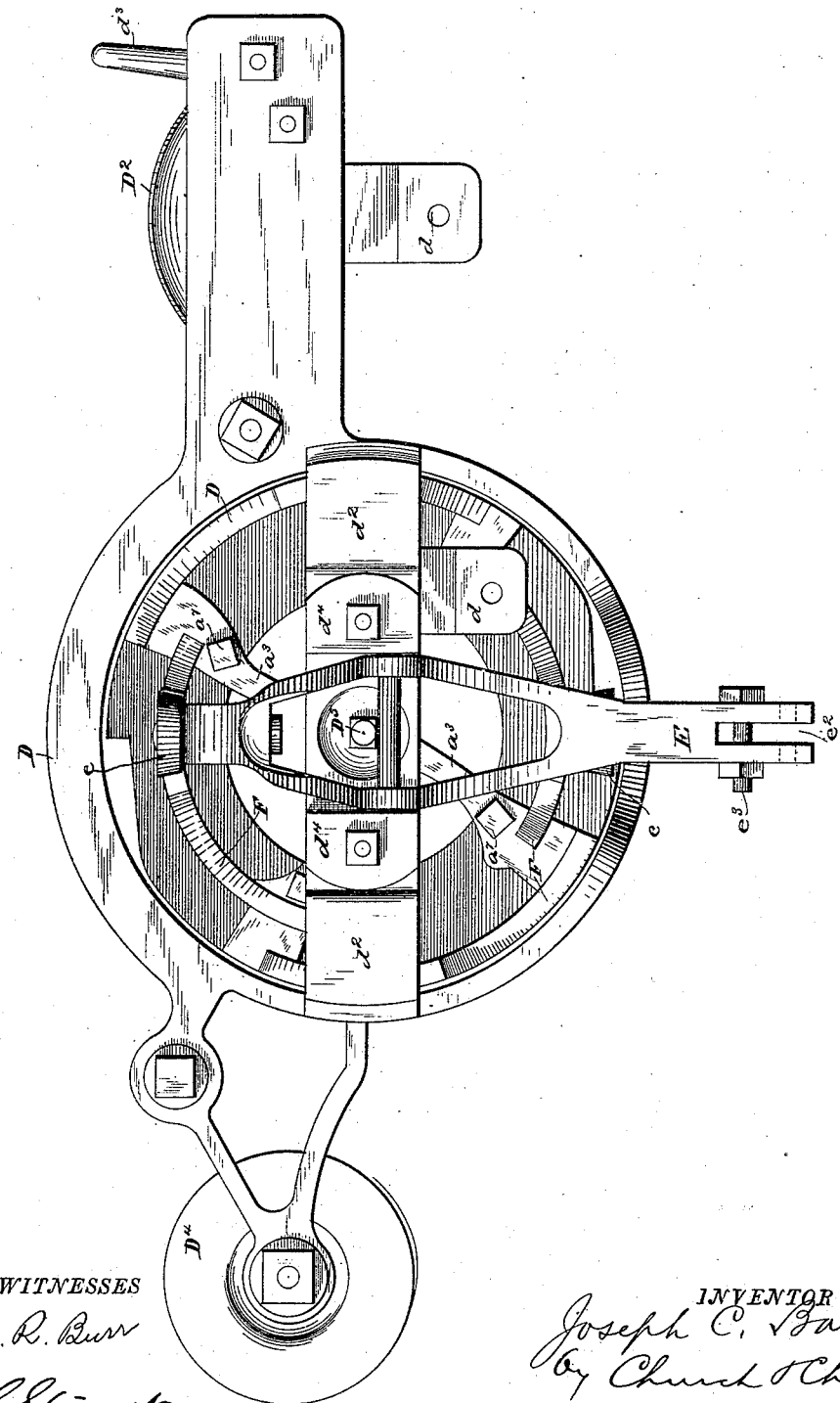

(No Model.)
J. C. BARLOW.
CHECK ROWER ATTACHMENT FOR CORN PLANTERS.
No. 312,695. Patented Feb. 24, 1885.
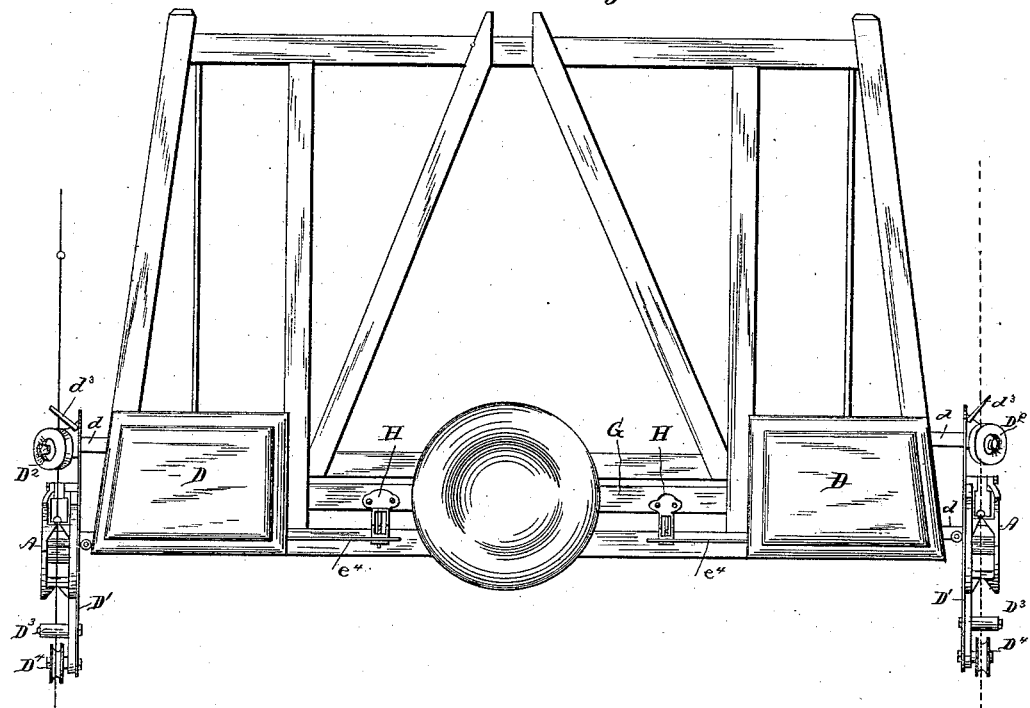
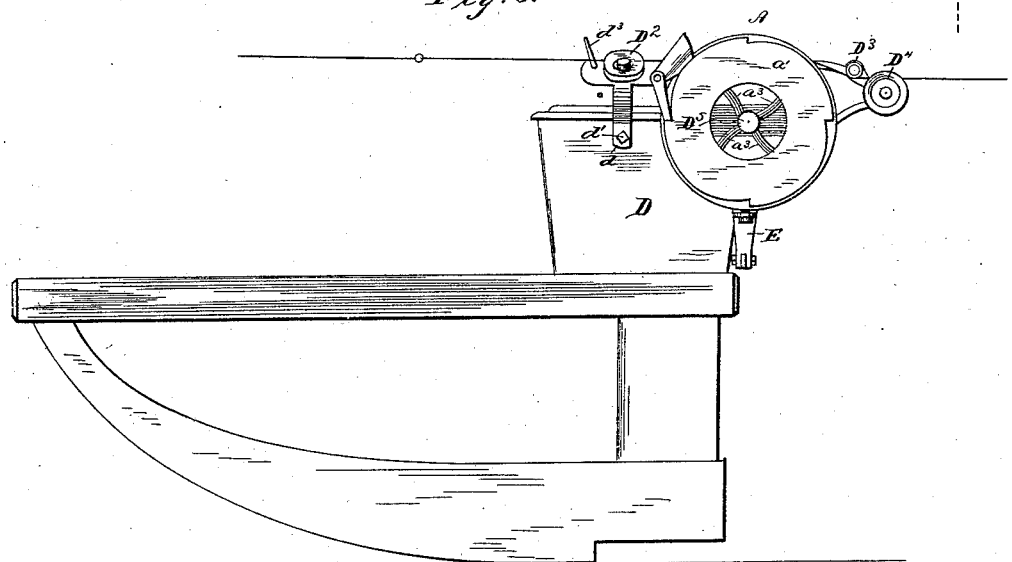

(No Model.) 5 Sheets—Sheet 5.
J. C. BARLOW.
CHECK ROWER ATTACHMENT FOR CORN PLANTERS.
No. 312,695. Patented Feb. 24, 1885.
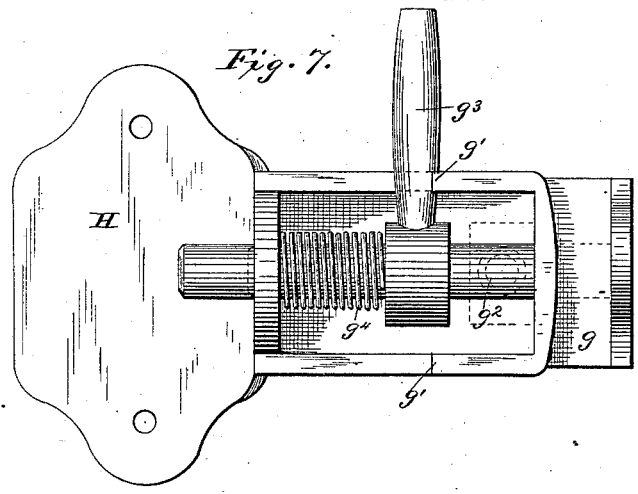
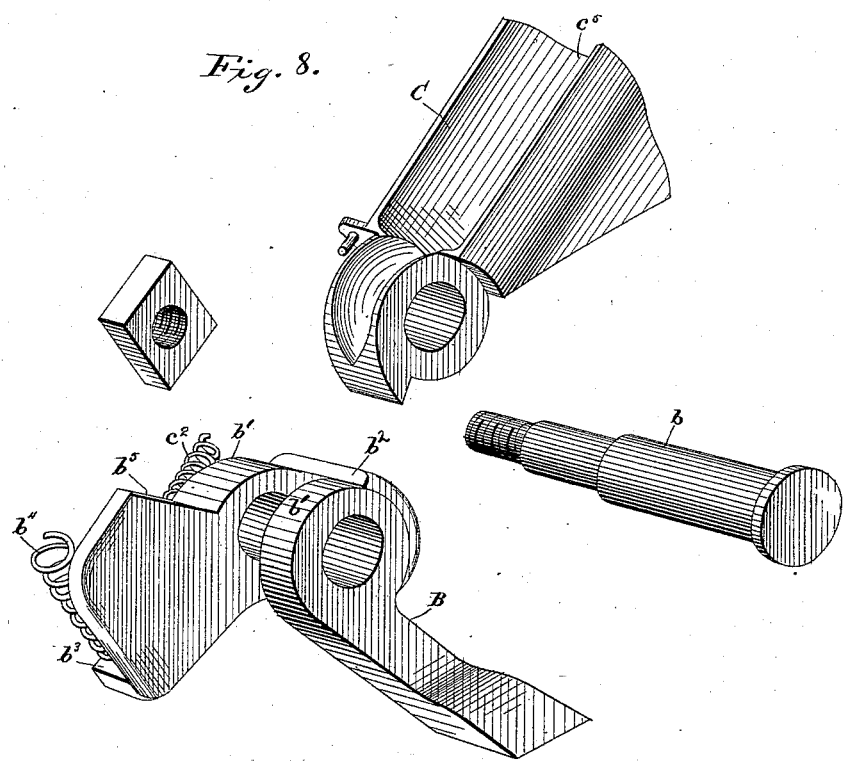
WITNESSES
Chas. R. Burr
A. F. Stuart
INVENTOR
Joseph C. Barlow
by Church & Church
His Attorneys.

UNITED STATES PATENT OFFICE.

JOSEPH C. BARLOW, OF QUINCY, ILLINOIS.

CHECK-ROWER ATTACHMENT FOR CORN-PLANTERS.

SPECIFICATION forming part of Letters Patent No. 312,695, dated February 24, 1885.

Application filed October 17, 1884. (No model.)

*To all whom it may concern:*

Be it known that I, JOSEPH C. BARLOW, of Quincy, in the county of Adams and State of Illinois, have invented certain new and useful Improvements in Check-Row Attachments for Corn-Planters; and I do hereby declare the following to be a full, clear, and exact description of the same, reference being had to the accompanying drawings, forming a part of this specification, and to the figures and letters of reference marked thereon.

My present invention is designed more especially for use in connection with that class of corn-planters wherein the seed dropping or feeding mechanism is driven from or actuated by the usual rope or cord provided with knots or projections arranged or applied at predetermined intervals; and it relates, particularly, to certain new and useful improvements in the construction, arrangement, and composition of the feed actuating or operating mechanism upon or in connection with which the said rope or wire is arranged to co-operate.

The main distinguishing characteristics of the present invention other and beyond the special and novel embodiment hereinafter described and shown are, first, a wheel or other suitable driver adapted and arranged to be intermittingly rotated by or through the medium of the knots or other protuberant portions of the rope or wire employed, a mechanism connected therewith or actuated thereby for communicating motion from said wheel or driver to the feeding or seed-dropping devices, a locking device or detent for automatically arresting and retaining the said wheel or driver after the passage of each knot or protuberance, and a device or mechanism actuated or operated upon by the knots or protuberances on the rope or wire, and before coming in contact with the said wheel or driver, to disengage the said locking device or detent, and thus permit the wheel or driver to be rotated by the rope or wire; second, a wheel or rotary driver adapted to be driven automatically by contact with knots or protuberances on a rope or wire, mechanism intermediate said driver and the feeding or seed-dropping mechanism for actuating the latter, a locking device or detent automatically applied to the driver for arresting its forward motion, a device, also automatically applied to said driver, to prevent its backward movement after the passage of a knot or protuberance, and a tripping mechanism operated by the knots or protuberances in advance of their application to the wheel or driver, and acting upon the locking device or detent to release the driver; and, third, a wheel or driver intermittingly rotated by contact with the knots or protuberances on the rope or wire, and provided with means for actuating the feeding or dropping mechanism, a locking device or detent for automatically arresting the forward motion of the driver after the passage of each knot or protuberance, a second detent or locking device for limiting the backward movement of the driver, said last-named detent being actuated by the knots or protuberances in advance of their application to the driver, and so connected to the first-named detent that it shall be automatically withdrawn or tripped by the knots or protuberances in advance of their application to the driver.

The invention further consists in the several combinations, arrangements, and constructions of parts, all as hereinafter more fully described, and pointed out in the claims.

In the accompanying drawings, illustrating an embodiment of my said invention, Figure 1 is a side elevation, and Fig. 2 an edge view, of the combined rotary driver and detents detached. Fig. 3 is a view in perspective of the rotary driver and attachments. Fig. 4 is a side view showing the mechanism for communicating motion from the driver to the feeding or dropping mechanism. Fig. 5 is a plan, and Fig. 6 a side elevation, of the runner-frame of a corn-planter, showing the manner of applying the attachment. Figs. 7 and 8 are details, the former showing the locking-bolt and the latter the detents detached. Fig. 9 is a view of the combined driver and operating-cam.

Similar letters of reference in the several figures indicate like parts.

As before stated, the present invention is designed especially for use in connection with that class of check-row corn-planters wherein the feeding or seed-dropping mechanism is operated by knots or projections on a rope or wire, the latter being as a rule anchored at some point in rear of the machine as it is drawn across the field. The rope or wire so anchored and extending in front of or carried by the machine is drawn through or across the mechanism for actuating the dropper, and as the machine advances the knots or protuberances upon the rope or wire, coming successively in contact with or engaging some part of the actuating mechanism, communicate to the latter an intermitting motion, which is transmitted through suitable mechanism to the feeding or dropping devices.

In the drawings, the letter A indicates the part referred to as a rotary driver, which may be of any approved form adapted to receive the rope or wire and engage the knots or protuberances thereon, but which is preferably constructed in the form of a wheel or drum with a groove or grooves to receive and guide the wire or rope and shoulders or abutments to engage the knots.

For the purposes of convenience in manufacture, simplicity in structure, and efficiency in operation, I prefer to construct this wheel or drum in two parts or sections, $a\ a'$. The section $a$ is provided with a hub, $a^2$, for attachment to a driving-shaft, or, as in the present instance, to receive the fixed stud or journal $D^5$, upon which it rotates, and with arms or spokes $a^3$, carrying the shoulders or abutments $a^4$. The section $a'$ is composed, essentially, of an annulus or disk, $a^5$, provided with the spacing-blocks or studs $a^6$, similar to those upon the opposite section. The two sections are jointed and held firmly together by bolts $a^7$, passing through both sections and the spacing-blocks $a^6$. The parts as thus constructed and combined form a drum or wheel wherein the space between the shoulders $a^4$ forms a groove for the reception and passage of the wire or rope, while the said shoulders serve to engage the knots or protuberances. As the intermitting action of the feeding or dropping mechanism is dependent upon the precision and regularity with which the driver A is operated, it is essential that the latter should be positively locked and prevented from moving except when acted upon by the knots or protuberances. In order to secure this all-important action of the driver, I combine therewith or apply thereto an automatic locking and unlocking mechanism whose movements are produced and controlled by the passage of the knots in succession. The essential requisites of this locking mechanism are, first, a pawl or other suitable detent adapted to engage at predetermined intervals, and as the requisite movement is completed, some portion of the driver or other mechanism controlled thereby, and thus arrest its further movement forward, and, second, a device actuated by the knot to release the pawl or detent and permit the driver to be again moved forward. In addition to these features, and as supplemental thereto, the releasing mechanism or device is so arranged and applied that it shall automatically lock the driver and prevent it from excessive backward movement until the knot is in position to again operate upon the driver. In this way not only is the driver locked after having completed the requisite forward movement and automatically unlocked when required, but excessive backward motion is prevented and the entire feeding mechanism held in position until the actuating device arrives in position to again set it in motion.

The mechanism shown in illustration of this part of my invention, and which constitutes an efficient means for carrying it into practical operation, consists, essentially, of a pawl, B, adapted to engage some portion of the rotary driver, and a rocking arm or lever, C, against which the knots strike or bear as they approach toward or recede from the driver, said arm serving not only to raise the pawl, but also to engage the driver and limit back motion.

To the frame of the attachment or machine is pivoted on a bolt, $b$, a pawl, B, whose end bears upon the periphery of the section $a'$ of wheel A, and engages in turn each of a series of shoulders, $a^9$, corresponding in number with the pairs of abutments or shoulders $a^4$. The pawl B is constructed with a shoulder, $b'$, and ears $b^2$, provided with openings to receive the bolt $b$, and it is further provided with a flanged extension or lug, as at $b^3$, against which bears a spring, $b^4$.

Standing above the pawl B, and in the path traversed by the wire or rope, is an arm or lever, C, slotted or bifurcated to receive and permit the passage of the plain portions of the wire or rope, but adapted to engage and be depressed by the knots or protuberances thereon. This arm C is arranged to bear upon or make contact with the shoulder $b^2$ of the pawl B, and thereby raise the latter out of engagement with the driver when the said arm C is rocked or moved by the approaching knot.

As a convenient way of combining the detent or locking pawl B and the disengaging or trip lever C, I have mounted them both on the bolt $b$, the pivot end of the lever C being received between the ears $b'$ and within the socket formed by said ears and the shoulder $b^2$ of the pawl B. As thus arranged and combined, the pawl B is held normally against the wheel A and in engagement with one of the shoulders thereon while the wire or rope passes freely through the slot in the lever C and between the shoulders or abutments $a^4$ of the wheel A. As soon, however, as a knot arrives at the lever C, and before it reaches the abutment $a^4$, it causes the lever C to turn upon its pivot, and, bearing upon the shoulder $b^2$, raises the pawl B from the driver and permits the latter to rotate.

In performing the operations described, the arm C and pawl B act practically as one device, and might be constructed in one piece.

In order the more compactly to arrange the locking and unlocking mechanism and to utilize the latter for locking the driver against excessive back motion, the lever C is so mounted and disposed with relation to the shoulders or abutments $a^4$ of the wheel A as that it shall project or drop behind said abutment after each movement of the driver. With this end in view, the lever C is mounted in close proximity to the wheel A, so that its outer end shall, when down, project within the space between the sections $a$ $a'$. The arm C, although for convenience pivoted upon the bolt $b$, is free to vibrate vertically or away from the shoulder $b^2$ over the pawl B, being held down either by the wire or rope passing through its slotted end, or, if desired, by a spring, $c^2$, or both. The outer or engaging ends of the arm C are preferably curved to facilitate their entrance behind the abutments $a^4$, their upper ends being somewhat projected to start the driver as the arm is depressed by the knots and the pawl withdrawn.

The operation of the devices as thus arranged and applied is as follows: When at rest, and while the plain portion of the rope or wire is passing through the arm C and between the abutments $a^4$, the pawl B engages one of the teeth or shoulders attached to the wheel A, while the arm C is held down behind one set of abutments $a^4$. When, now, a knot or protuberance on the rope or wire strikes the arm C, the latter will be suddenly depressed and held down until the knot passes off the arm and engages the abutment on the driver, behind which the free end of the arm C rested. As the arm C is depressed, it raises the pawl B, and the projecting or cam-shaped extremity, striking the abutment, starts the driver forward, the movement being taken up and maintained by the knot, which latter, as it passes from the end of the arm C, engages the abutments $a^4$, thereby carrying forward the driver. As soon as the knot leaves the arm C the pawl B, being no longer held, falls into contact with the wheel, and, impinging against the next shoulder, arrests the motion of the driver. In the meantime the next succeeding set of abutments $a^4$ have, by coming in contact with its under edge, elevated and passed beyond the arm C, and the latter has dropped again behind the said abutments.

Although for certain obvious reasons the provision made for starting the driver by the depression of the lever C is desirable, it is not otherwise essential.

As hereinbefore indicated, it is not essential to their operation that the pawl B and arm C be made separate, except when the latter is employed to check back motion of the driver, and when employed for that purpose the following special provisions may be made with improved results as to safety from catching and clogging:

At some convenient point on the pawl B is arranged a shoulder, $b^5$, against which the arm C or a projection thereon makes contact, thus permitting the arm C to have a slight movement independent of the pawl. As thus arranged, the arm C, when raised by the abutments $a^4$, will, by striking against the shoulder $b^5$, force the pawl down and into position to engage the next succeeding shoulder on the wheel A, thereby preventing the driver from being carried or thrown too far forward, and as soon as the abutment has passed from under the arm C the latter is forced down until it rests against the shoulder $b^2$ by the spring, the operating rope or wire, or by both combined, while the pawl B remains stationary and in contact with the wheel A. If from any cause the pawl B should not be fully withdrawn from engagement with the wheel A, when the knot makes contact with the abutments on the driver, serious damage might ensue. Such accidents can be prevented by making a narrow groove in arm C for the passage of the wire or cord, and forming shoulders $c^5$ tangential or at a suitable angle to the circumference of the wheel A, against which shoulders the knots make contact, and thereby cause the arm C to rock on its axis. The outer ends of the shoulders $c^5$, or that portion over which the knots pass to the wheel A, stand at such a distance above the wheel that unless the arm C is depressed sufficiently to raise the pawl clear of the wheel, the knots, instead of being delivered in line with the abutments $a^4$, will be raised above them and pass over the driver without engaging it. If, on the other hand, the arm C is sufficiently depressed to release the pawl, the knot will be delivered in line with the abutments and in position to operate upon the driver.

The mechanism as thus far described constitutes what has been termed the "driver," being that part or portion of the machine which, receiving motion from the rope or wire, actuates the feeding or dropping mechanism. It forms a separate and distinct attachment capable of being applied and used advantageously in connection with almost any feeding device, either by modifications to suit the particular structure or by the simple application thereto of ordinary and well-known connecting devices. In the present instance I have shown it as applied and adapted to the runner-frame of a corn-planter of well-known construction, but do not desire to be understood as in any manner limiting my invention thereby except in those particulars mentioned in the claims.

To the side of the seed box or hopper D, or upon any other convenient portion of the machine, is secured a frame, D', which, in the present instance, is provided with brackets $d$, through which and into the hopper are passed the bolts $d'$. This frame D' is constructed with a circular opening at or near the center, and with two arms or brackets provided with the usual guiding rollers and pulleys, $D^2$ $D^3$ $D^4$, and guide-pin $d^3$, which serve to guide and direct the rope or wire in its passage to and from the driver. The pin $b$, upon which the pawl B and arm C are mounted, is also fastened to this frame, as shown.

On the side of the frame toward the hopper are formed two arms or brackets, $d^2$, extending from opposite sides and part way across the circular opening in the frame, and to these arms $d^2$ is bolted a bridge or saddle, $d^4$, the two flanges resting in contact with and upon arms $d^2$, and the cross-piece carrying a pin or journal, $D^5$, to receive the wheel or driver A. The saddle may, if desired, be cast integral with the frame $D'$.

Within the saddle or bridge piece $d^4$ is hung on a suitable pivot or pivots a rocking bar or lever, E, provided with rollers $e$, which alternately engage cams F, fastened to the section $a$ of the wheel or driver A. The pivot or pivots of the lever E are located below or to one side of the center of the pin $D^5$, on which the driver rotates, and the cams or cam-surfaces F are alternately disposed at the same but at relatively different distances from the center of the driver A, so that when one cam engages one roller $e$ the other roller will fall inside or outside of the cam diametrically opposite thereto. This arrangement of the operating mechanism with respect to the driver proper is compact, simple, and efficient, and the attachment as a whole can be readily applied or removed from the machine with which it is associated. As the driver is intermittingly rotated by the knotted wire or rope, the cams applied thereto and acting upon the rollers $e$, as described, oscillate the lever E upon its pivots, and it is only necessary to connect this lever to the reciprocating bar or other movable part of the feeding or dropping mechanism to obtain the desired intermitting action.

The following improved means have been devised for making this connection between the vibrating or reciprocating part E of the driving mechanism and the sliding bar G, which actuates the dropping or feeding devices, applicable also to other forms of driving mechanisms: One end of the lever E is slotted, as at $E^2$, and provided with a series of holes to receive a pin or bolt, $e^3$, passing through one end of the connecting-rod $e^4$. To the bar G is secured a plate or bracket, H, provided with the open slotted end $g$ and shoulders $g'$. A bolt, $g^2$, provided with a handle or thumb-piece, $g^3$, and pressed forward by a spring, $g^4$, is mounted to slide in a frame, H, and with its end projecting into the slot $g$. The connecting-rod $e^4$ rests loosely in the groove or slot $g$, and is provided with a notch or opening, $e^5$, to receive the end of bolt $g^2$.

When it is desired to disconnect the driving from the feeding mechanism, the bolt $g^2$ is withdrawn from the notch and the handle turned down behind one of the shoulders $g'$. In this position the connecting rod or the bar G is free to be moved with reference to the other, and when it is desired that they shall be connected to move together the handle of the bolt is raised out of engagement with the shoulder $g'$, and the spring will force the bolt into the notch in the connecting-rod as soon as it is brought in line. The provision thus made for quickly connecting and disconnecting the driver is especially advantageous when two independent drivers are employed, one at either side of the machine, and both arranged to operate upon the same bar, the one as the machine is moved in one direction and the other as the machine returns to the side of the field from whence it started.

Where, as in the present instance, a rotary wheel or driver is employed having a slot or groove to receive the rope or wire and a series of shoulders or abutments upon which the knots or protuberant portions engage, it is necessary that some means be used to insure the proper seating of the wire or rope in the groove of the wheel as the latter revolves. In order to accomplish this result without necessarily increasing the diameter of the wheel, I prefer to form the slots or grooves between the proximate faces of the abutments $a^4$ of a width and depth sufficient to receive and guide the wire or rope, but prevent the passage therethrough of the knots; and back of the said abutments I form or apply inclines or bevels, $a^{10}$, which latter, as the wheel A revolves, catch the wire or rope extending above and through the wheel and direct it into the more narrow slot or groove between the abutments. The walls of the slot in the lever C are, for a like reason, extended and made flaring, so that as the knots pass off the wire or rope shall be again caught by the arm as it rises.

I claim as my invention—

1. The combination, with the rotary driver provided with shoulders or abutments to engage the knots, of a detent arranged to drop behind said shoulders or abutments, and thereby limit the backward motion of the driver, a second detent connected to said first-named detent and arranged to be withdrawn by the passage of the knot, said first-named detent being provided with the slotted end for the passage of the rope or wire, and the inclined or tangential shoulders to engage the knots, substantially as described.

2. In combination with the knotted rope or wire, the rotary driver provided with the abutments or shoulders, and the incline located in advance of the said shoulders to direct the wire or rope into the narrow space between the abutments, substantially as described.

3. In combination with the rotary driver provided with abutments, as described, the pivoted lever or detent engaging said abutments, and provided with the slotted extremity and flaring walls, substantially as described.

4. In combination with the rotary driver provided with abutments or shoulders and a groove for the rope or wire, the pivoted arm or lever and the detent, the said arm or lever engaging the said detent on one side of its pivot, but having a slight movement independent thereof, substantially as and for the purpose set forth.

5. In combination with the rotary driver, its abutments and ratchet, the two detents pivoted upon the same bolt and operating together to stop and release the driver, substantially as described.

6. As an improved attachment for communicating motion from the knotted cord or wire to the feeding or dropping mechanism of a planter, the detachable frame provided with suitable guiding-pulleys, the rotary driver, automatic locking and unlocking detents, and a mechanism connected to said driver, and operating thereby to actuate the feeding devices, substantially as described.

7. In combination with a rotary driver which receives motion from the knotted cord or wire, the driving-cam provided with two series of inclines, as described, and a vibratory lever provided with rollers which alternately make contact with one series of inclines and drop beside the inclines of the next series, substantially as and for the purpose set forth.

8. The combination, in a driving attachment for corn-planters, of the frame, the driver centrally supported and carrying the operating cams or inclines, the detents, and the lever pivoted to one side of the axis of the driver and carrying rollers to co-operate alternately with the cams or inclines, substantially as described.

9. A rotary driver for attachment to check-row corn-planters, constructed, substantially as described, in two sections, $a$ $a'$, the one provided with a hub and spokes carrying abutments $a^4$, and the other in the shape of an annulus or disk with spacing blocks or studs, the said sections being united by bolts or rivets, substantially as described, whereby a wheel is formed having a groove for the reception of the rope or wire and abutments for engaging the knots thereon.

10. The combination, in a check-row corn-planter and with the feeding or dropping mechanism thereof, of two independent rotary driving mechanisms, located the one on either side of the machine, both of said driving mechanisms being independently connected to the feeding mechanism by a detachable locking-bolt, whereby either can be operated without affecting the other, substantially as described.

11. As a means for detachably connecting the actuating mechanism to the reciprocating members of the feed-operating mechanism, and in combination therewith, the notched or perforated bar, the frame or bracket applied to the feed-operating mechanism and provided with a slot to receive and guide the said bar, and the movable locking-bolt whereby the said bar may be locked to the feed-actuating mechanism, and when unlocked may be supported and guided in position to be again locked, substantially as described.

12. In a feed-driving attachment for corn-planters, the combination of the frame provided with arms or brackets for the guiding-rollers and pulleys, a central opening, and the bridge piece or saddle located within or extending across said opening, and carrying a pin or journal, substantially as described, with the rotary driver and its attached cams mounted upon the aforesaid pin or journal, and the vibrating lever located and pivoted within the saddle or bridge-piece, substantially as described.

13. In combination with the rotary driver, the pawl B, provided with shoulders and ears, as described, and the arm or lever C, adapted to fit between the ears and make contact with the shoulders on the pawl B, both said pawl B and arm or lever C being supported upon the same bolt or pivot, substantially as described.

14. As a means for intermittingly operating the feeding mechanism from or by means of a knotted rope or wire, and in combination with the latter, a rotary wheel or drum provided with shoulders or abutments to engage the knots, a detent or locking device for limiting the rotation of the said wheel or drum, and a trip mechanism actuated by the passage of the knots to release the detent, substantially as and for the purpose described.

15. In combination with a rotary drum or wheel provided with shoulders or abutments to engage the knots on the rope or wire, a detent normally held in engagement with said rotary drum or wheel, and a trip actuated by the knots in advance of their application to the wheel or drum and operating to disengage the detent and permit the wheel to revolve, substantially as described.

16. In a check-row corn-planter, and in combination with the feeding or dropping mechanism thereof, a rotary driver adapted to engage the knots or protuberant portions of a rope or wire, a detent or locking device limiting the movement of the driver, and a trip for releasing the detent by the action of the knots thereon, substantially as described.

17. A rotary driver for check-row corn-planters, constructed, substantially as described, with a rotary wheel or drum provided with abutments to engage the knots, a detent for limiting the throw of the wheel, and a second detent for limiting the back motion of the wheel, said last-named detent located in the path traversed by the wire or rope, and being actuated thereby to raise or release the first detent, substantially as described.

18. In combination with a rotary driver adapted to co-operate with and be driven by knots or projections on a rope or wire, an automatic locking and unlocking device or mechanism operated by the knots to release the driver, substantially as described.

JOSEPH C. BARLOW.

Witnesses:
 FRED F. CHURCH,
 L. B. BOSWELL.